(12) United States Patent
Nam et al.

(10) Patent No.: US 7,945,247 B2
(45) Date of Patent: May 17, 2011

(54) DEVICE AND METHOD FOR USING HISTORY MENU ON MOBILE TERMINAL

(75) Inventors: Han Soek Nam, Metropolitan (KR); Bong Kyun Kim, Seongnam-si (KR); Hwan Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 820 days.

(21) Appl. No.: 11/819,231

(22) Filed: Jun. 26, 2007

(65) Prior Publication Data

US 2008/0009311 A1    Jan. 10, 2008

(30) Foreign Application Priority Data

Jul. 6, 2006    (KR) .................. 10-2006-0063427

(51) Int. Cl.
*H04L 12/58*    (2006.01)
(52) U.S. Cl. .............. 455/412.1; 455/415; 455/418
(58) Field of Classification Search .............. 455/412.1, 455/418, 415
See application file for complete search history.

(56) References Cited

U.S. PATENT DOCUMENTS

| | | | | |
|---|---|---|---|---|
| 5,634,196 A | | 5/1997 | Alford ........................ | 455/18 |
| 2001/0042103 A1* | | 11/2001 | Tomari et al. ............... | 709/206 |
| 2005/0130631 A1* | | 6/2005 | Maguire et al. ............ | 455/414.1 |
| 2005/0240681 A1* | | 10/2005 | Fujiwara et al. ............ | 710/1 |
| 2006/0023722 A1 | | 2/2006 | Jung et al. .................. | 370/395.4 |
| 2006/0025112 A1 | | 2/2006 | Hamanaga et al. ......... | 455/412.1 |
| 2007/0240081 A1* | | 10/2007 | Grossman et al. ........... | 715/854 |
| 2009/0252313 A1* | | 10/2009 | Naruse ....................... | 379/112.06 |
| 2010/0094976 A1* | | 4/2010 | Kanefsky et al. ............ | 709/219 |

FOREIGN PATENT DOCUMENTS

JP    2004-350291    12/2004
KR    1020040045549 A    6/2004

* cited by examiner

*Primary Examiner* — Barry W Taylor
(74) *Attorney, Agent, or Firm* — Roylance, Abrams, Berdo & Goodman L.L.P.

(57) ABSTRACT

A device and a method for using a history menu on a mobile terminal that has a history data base for storing a history of executions of contents, which allows easy execution of recently used menu or content are provided. The method includes extracting, upon execution of content on the mobile terminal, content information pertaining to the executed content, storing the extracted content information in the history database, displaying, if a history key is input, content information stored in the history database and executing, upon selecting one of the displayed content information, content corresponding to the selected content information. The method allows display of a list of contents using a call key while enabling a user to execute content upon selection, thus making it easier for the user to re-execute recently used contents.

18 Claims, 6 Drawing Sheets

| SERIAL NUMBER | CATEGORY | NAME | LOCATION | LINKER PROGRAM | EXECUTION STARTED / TERMINATED TIME |
|---|---|---|---|---|---|
| 1 | E-mail | HONG KIL-DONG | | Outlook | 06. 06. 05  09:00:13/ 06. 06. 05  09:11:33 |
| 2 | VIDEO | WORLD CUP KOREA VS.SWITZERLAND | mms://www.flfa.com/final.asf | Media player | 06. 06. 05  09:15:21/ 06. 06. 05  09:43:07 |
| 3 | AUDIO SOURCE | OH VICTORY KOREA | /music/worldcupsong/ | Sound player | 06. 06. 05  09:50:55/ 06. 06. 05  09:55:38 |
| 4 | INTERNET | WORLD WANT PARAN | http://www.paran.com/sport.php | Explorer | 06. 06. 05  10:03:18/ 06. 06. 05  10:09:19 |
| 5 | CALL | JANGKEUMI | | Phone | 06. 06. 05  10:09:23/ 06. 06. 05  10:17:09 |
| 6 | SMS | LEE SAM-SIK | | SMS | 06. 06. 05  10:29:03/ 06. 06. 05  10:30:46 |
| ⋮ | ⋮ | ⋮ | ⋮ | ⋮ | ⋮ |

FIG. 2

| SERIAL NUMBER | CATEGORY | NAME | LOCATION | LINKER PROGRAM | EXECUTION STARTED / TERMINATED TIME |
|---|---|---|---|---|---|
| 1 | E-mail | HONG KIL-DONG | | Outlook | 06. 06. 05  09:00:13/ 06. 06. 05  09:11:33 |
| 2 | VIDEO | WORLD CUP KOREA VS.SWITZERLAND | mms://www.fifa.com/fi nal.asf | Media player | 06. 06. 05  09:15:21/ 06. 06. 05  09:43:07 |
| 3 | AUDIO SOURCE | OH VICTORY KOREA | /music/worldcupsong/ | Sound player | 06. 06. 05  09:50:55/ 06. 06. 05  09:55:38 |
| 4 | INTERNET | WORLD WANT PARAN | http://www.paran.com /sport.php | Explorer | 06. 06. 05  10:03:18/ 06. 06. 05  10:09:19 |
| 5 | CALL | JANGKEUMI | | Phone | 06. 06. 05  10:09:23/ 06. 06. 05  10:17:09 |
| 6 | SMS | LEE SAM-SIK | | SMS | 06. 06. 05  10:29:03/ 06. 06. 05  10:30:46 |
| ... | ... | ... | ... | ... | ... |

DEVICE AND METHOD FOR USING HISTORY MENU ON MOBILE TERMINAL

CROSS-REFERENCE TO RELATED APPLICATIONS

This application claims the benefit under 35 U.S.C. §119 (a) of Korean Patent Application filed in the Korean Intellectual Property Office on Jul. 6, 2006 and assigned Serial No. 2006-0063427, the entire disclosure of which is hereby incorporated by reference.

BACKGROUND OF THE INVENTION

1. Field of the Invention

The present invention relates to a method and device for using a menu in a mobile terminal. More particularly, the present invention relates to a method and device for using a history menu on a mobile terminal, which allows easy execution of a recently used menu or content.

2. Description of the Related Art

In general, a mobile terminal refers to a terminal that is carried by an individual user and supports various functions using application programs including wireless communication services. Examples of a mobile terminal may include a personal mobile communication services terminal, a personal digital assistant (PDA), a smart phone, an international mobile telecommunication 2000 (IMT-2000) device, and a wireless local area network (LAN) terminal.

Generally, a mobile terminal has voice call and short message service (SMS) functions. However, the recent rapid development of mobile communication technology has allowed a mobile terminal to support diverse and sophisticated functions including video calls, an electronic-note function, audio/image storage, Internet access, entertainment features, a music playing function, and a camera function to satisfy the changing needs of mobile consumers. Thus, a mobile user can use a mobile terminal to perform various tasks, including placing a voice call, taking a picture, and accessing the Internet.

However, a conventional mobile terminal requires a user to select a desired menu or content by stepping through a number of menus within a menu structure before being able to execute a desired function. This menu selection method makes it difficult for a user who is unaware of the menu structure to effectively use menus. Even if a user is familiar with the menu structure, this menu selection method also requires a user to step through numerous levels of menus in order to select the desired menu. Furthermore, when a user wishes to re-execute recently used content, the user needs to select the content by again stepping through the same menu structure, thus causing user inconvenience.

In order to access a desired website, a user executes a web browser and enters the Internet address of the desired website. When the user wishes to re-access the same website after terminating the Internet connection, they have to access it by repeatedly performing the above steps. As another example, when a user desires to listen to a specific music file (for example, an MP3 file), they execute a playback program, search for a source file stored in the mobile terminal, and select the found source file. Each time access is desired to the same source file after terminating the playback program, the user must repeat the same steps as previously performed.

As described above, the conventional mobile terminal has a drawback in that, in order for a user to execute the desired content, the user must step through the complicated menu structure each time the user wants to use the same content, thus resulting in reduced user satisfaction.

Accordingly, there is a need for an improved device and method for using a history menu.

SUMMARY OF THE INVENTION

Exemplary embodiments of the present invention address at least the above problems and/or disadvantages and provide at least the advantages described below. Accordingly, an aspect of the present invention is to provide a mobile terminal with a history menu and a method for using the history menu on the mobile terminal that enable a user to easily access previously used content.

In order to achieve the above object, according to an exemplary embodiment of the present invention, there is provided a device and method for using a history menu on a mobile terminal that has a history database for storing a history of executions of content, the method including extracting, upon execution of content on the mobile terminal, content information pertaining to the executed content, storing the extracted content information in the history database, displaying, if a history key is input, the content information stored in the history database and executing, upon selecting one of the displayed content information, content corresponding to the selected content information.

The content information stored in the history database may contain category, name, location, linker program, execution started/terminated time, and the like.

In an exemplary embodiment, extracting of the content information pertaining to the executed content is performed when the content has been executed for longer than a valid duration. The valid duration may vary depending on the type of the content.

In an exemplary embodiment, storing of the extracted content information includes determining whether the same content information as the content information pertaining to the executed content is already stored in the history database, deleting, if the same content information is already stored in the history database, the already stored same content information and additionally storing the extracted content information in the history database. In an exemplary embodiment, if the same content information is not already stored in the history database, the extracted content information is stored therein.

In an exemplary embodiment, extracting the content information and storing the extracted content information in the history database are repeatedly performed each time content is executed on the mobile terminal.

Displaying the content information stored in the history database may comprise displaying a list of contents arranged in descending order from most recently executed to least recently executed content or the content information classified into categories.

Displaying the content information stored in the history database may include displaying, if the history key is input, a list of categories and displaying, if a category is selected from the list of categories, a list of contents corresponding to the selected category.

In an exemplary embodiment, the content includes calls, messages, Internet, e-mails, images, music, games, mobile content, and the like.

Displaying the content information stored in the history database may comprise displaying, if the content of a displayed content information is the Internet content, the title or URL (Uniform Resource Locator) address of an immediately previously accessed web page of the content. If the content of displayed content information is e-mail, a sender of the e-mail most recently confirmed by a user can be displayed. If the content of displayed content information is image or music, the title or file name of the image or music may be displayed. In an exemplary embodiment, information pertaining to a number of contents less than a predetermined number may be displayed.

BRIEF DESCRIPTION OF THE DRAWINGS

The above and other objects, features and advantages of the present invention will be more apparent from the following detailed description in conjunction with the accompanying drawings, in which:

FIG. 2 schematically illustrates the structure of a history database according to an exemplary embodiment of the present invention;

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Hereinafter, exemplary embodiments of the present invention are described in detail with reference to the accompanying drawings. Elements may be schematically illustrated or omitted for simplicity and clarity and have not necessarily been drawn to scale.

Figure 1:
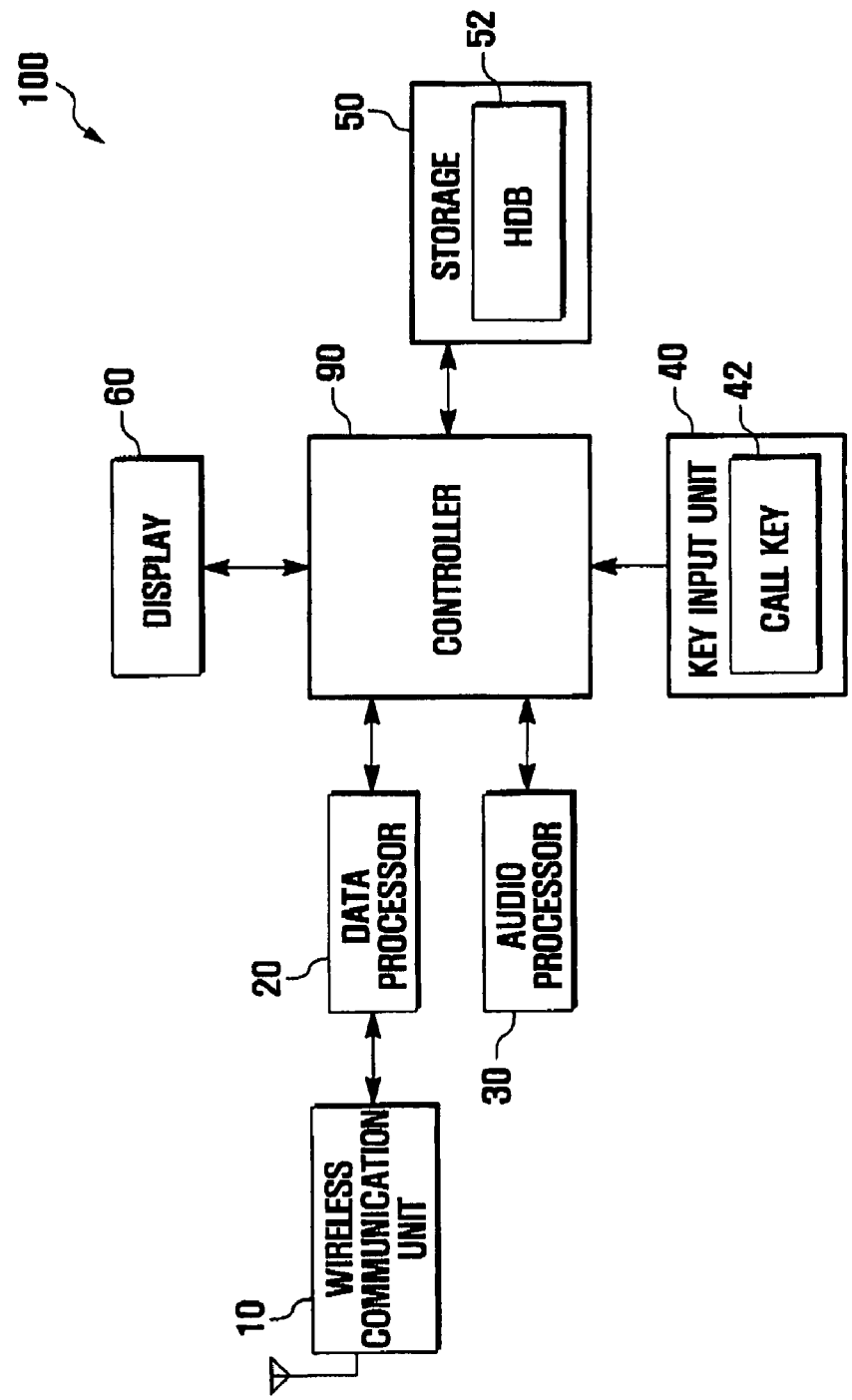
FIG. 1 is a schematic block diagram illustrating a configuration of a mobile terminal according to an exemplary embodiment of the present invention.

FIG. 1 is a schematic block diagram illustrating the configuration of a mobile terminal 100 according to an exemplary embodiment of the present invention.

Referring to FIG. 1, the mobile terminal 100 includes a controller 90, a wireless communication unit 10, a data processor 20, an audio processor 30, a key input unit 40, a storage device 50, and a display 60.

The controller 90 performs the overall control operation of the mobile terminal 100. When content is executed on the mobile terminal 100, the controller 90 extracts content information and controls the storage device 50 to store the extracted content information. The controller 90 also controls the display 60 to display the content information on a screen when a specific key (for example a call key 42) is input.

In an exemplary embodiment, the content may include phone calls, messages, e-mails, images, music, games, other mobile contents and the like. That is, the content may include programs that can be executed on the mobile terminal 100 in response to a user's manipulation and associated data files.

The wireless communication unit 10 transmits and receives data for wireless communication. To achieve this function, the wireless communication unit 10 includes an RF transmitter that up-converts and amplifies the frequency of a signal being transmitted and an RF receiver that low-noise amplifies a signal being received and down-converts its frequency. The wireless communication unit 10 receives data via a wireless channel to output the data to the data processor 20 and receives data from the data processor 20 to transmit the data through the wireless channel.

The data processor 20 includes a transmission module that encodes and modulates a signal to be transmitted through the wireless channel and a reception module that demodulates and decodes a signal received through the wireless channel. The data processor 20 then transmits the demodulated/decoded data to the controller 90.

The audio processor 30 includes a coder/decoder (CODEC). The CODEC consists of a data codec for processing incoming data such as packet data and an audio codec for processing audio signals such as voice. The audio processor 30 converts a digital audio signal fed into the data processor 20 to an analog signal during a voice call on the mobile terminal 100 through the audio codec and plays back the analog signal through a speaker. The audio processor 30 also converts an analog audio signal received through a microphone to a digital audio signal through the audio codec and transmits the digital audio signal to the data processor 20.

The key input unit 40 includes multiple character keys (not shown) for inputting numeric and character information and control keys (not shown) for controlling the operation of the mobile terminal 100.

Conventionally, a user presses a call key 42 to view a call history. Similarly, the key input unit 40 of an exemplary embodiment of the present invention uses the call key 42 as a history key for displaying content information stored in the storage 50 on the screen. When the user inputs the call key 42 while the mobile terminal 100 is in a standby mode, the mobile terminal 100 displays the call history as well as information pertaining to previously executed contents. This function may be performed by character keys or control keys other than the call key 42 or be realized in software.

The display unit 60 displays data output from the controller 90 on the screen. The display 60 may be a liquid crystal display (LCD). In an exemplary embodiment, the display 60 includes an LCD controller, a memory for storing image data, and an LCD display element. When the LCD is implemented using touch screen technology, the screen of the display 60 may function as an input portion.

The storage device 50 may include program memories for storing programs for controlling the operation of the mobile terminal 100 and data memories for storing data generated while executing the programs. The storage device 50 may further include a history database (HDB) 52 for storing content information extracted by the controller 90.

FIG. 2 schematically illustrates the structure of a history database according to an exemplary embodiment of the present invention.

Referring to FIGS. 1 and 2, the HDB 52 for storing the content information extracted by the controller 90 has data fields including serial number (ID), category (C), name (N), location (L), linker program (A), and execution started/terminated time (T). The serial number (ID) is a number automatically set each time a record is added. The categories (C) of the HDB 52 may variously include call, message (Short Message Service (SMS)/Multimedia Messaging Service (MMS)), Internet, e-mail, video, still images, music, and personal management. The categories (C) can be set or modified by a user.

Content titles or data file names may be stored in the name (N). For example, when the content consists of specific data such as music/images, the name of a data file may be stored in the name (N). When the content consists of a single program such as game, a game title may be stored in the name (N). When the content is Internet content, a title or Uniform Resource Locator (URL) address of an appropriate web page may be stored in the name (N).

The location of a data file or execution file for a program may be stored in the location (L). When a data file of content is stored at a specific position within the mobile terminal 100, the position is stored in the location (L). As another example, when content is streamed in real-time for execution, the URL address of the content is stored in the location (L). In the same manner, when the content is Internet content, the URL address of an appropriate web page is stored in the location (L).

Application programs needed to execute content may be stored in the linker program (A). For example, when the content is music/images, an application program for playing back a music/image data file may be stored in the linker program (A). When an application program is itself content as in games or calls, no program is stored in the linker program (A).

The times when execution of content started and was terminated may be stored in the execution started/terminated time (T). In an exemplary embodiment, the execution started time and execution terminated time expressed in terms of year, month, day, hour, minute, and second are stored in the execution started/terminated time (T). Thus, the controller 90 can be aware of the order that each content has been executed based on data stored in the execution started/terminated time (T).

An example of storing content information in the HDB 52 is described here in more detail with reference to FIG. 2.

A third record (serial number (ID) 3) of the history database in FIG. 2 stores information pertaining to music content 'Oh Victory Korea'. More specifically, the third record contains the category (C) specifying 'audio source', the name (N) specifying a song title 'Oh Victory Korea', the location (L) specifying '/music/worldcupsong/' (which is located within the storage device 50 of the mobile terminal 100), the linker program (A) specifying 'sound player' (for playing audio from the audio source), and the execution started/terminated time (T) specifying '06.06.05 09:50:55/06.06.05 09:55:38'. Based on the content information, the controller 90 can recognize that the music file 'Oh Victory Korea' located at '/music/worldcupsong/' within the mobile terminal 100 was played back through a sound player from Jun. 5, 2006, 9:50:55 am to 9:55:38 am.

Figure 3:
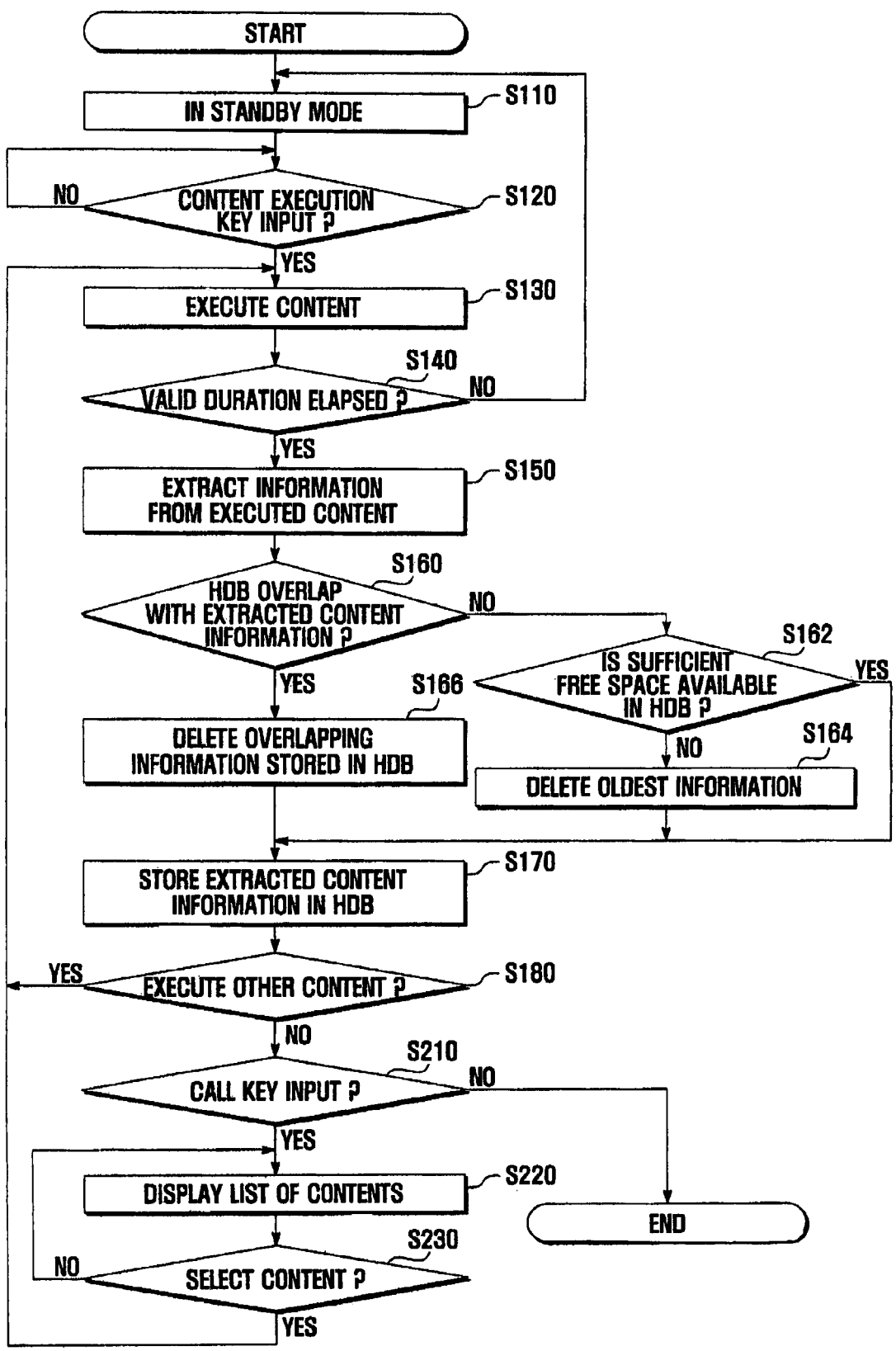
FIG. 3 is a flowchart illustrating a method for using a history menu on a mobile terminal according to an exemplary embodiment of the present invention.

FIG. 3 is a flowchart illustrating a method for using a history menu on a mobile terminal according to an exemplary embodiment of the present invention.

Referring to FIGS. 1-3, when the mobile terminal 100 is in a standby mode (S110), the mobile terminal 100 determines whether a content execution key (not shown) is input (S120). If a user manipulates the mobile terminal to select a content and inputs the content execution key, the controller 90 executes the selected content and controls the display 60 to display the content (S130).

The mobile terminal 100 determines whether the content has been executed for longer than a content valid duration (S140). The content valid duration is used to determine whether the content has been mistakenly executed due to a user mistake. The content valid duration may be preset by the user and stored in the storage device 50. The content valid duration may be modified by the user and vary depending on the category to which the content belongs to.

For example, in the case of a music file, when a valid duration for a music category (C) is set to 10 seconds and the music file has been played for longer than 10 seconds, the controller 90 determines that the music file selected by a user has been properly executed and recognizes it as a valid execution. If however, the music file ceases to be played before 10 seconds have elapsed, the controller 90 determines that the music file has been accidentally executed due to a user mistake and recognizes it as invalid execution.

As another example, when a valid duration for a call category (C) is set to 3 seconds and 3 seconds elapse after inputting the caller key 42 for making a call, the controller 90 recognizes that the call has been normally made. Conversely, if the call is terminated before 3 seconds have elapsed, the controller 90 determines that the call has been mistakenly made due to a user or other mistake.

In an exemplary embodiment, when the content belongs to a category (C) such as text message, multimedia message, or e-mail, the controller 90 determines that the content has been normally executed only when it has been properly received and forwarded. Thus, in this case, a valid duration for the content may be not specified.

As described above, if a measured duration for which content has been actually executed by the user is shorter than a valid duration, in other words the execution of content is terminated prior to expiration of the valid duration for the content, the controller 90 determines that the content has been accidentally executed due to a user or other mistake and regards it as an invalid execution. Conversely, if the content continues to be executed for longer than the valid duration, the controller 90 determines it as a valid execution.

If the controller 90 determines that execution of the content is invalid, information is not extracted from the executed content and the controller returns to the standby mode. Conversely, in the case of valid execution, the controller 90 extracts information from the executed content (S150). The controller 90 extracts content information that will be stored for each data field in the HDB 52. The execution terminated time T may be extracted upon terminating the execution of content.

For example, when the user uses music content, the controller 90 may extract data including the category of the content being executed (audio source), name of the music file being played (Oh Victory Korea), location of the music file (/music/worldcupsong/), application program needed to play the music file (sound player), and execution started/terminated time (06.06.05 09:50:55/09:55:38).

As another example, when the user enters a specific address into the Internet browser address window to access a desired website, the controller 90 may extract data including category of content (Internet), title of the accessed web site (The world wants Paran), URL address of the website (www.paran.com), Internet browser program being currently used (Explorer), and website access started/terminated time (06.06.05 10:03:18/10:09:19).

After the content information has been extracted, the controller 90 determines whether the extracted content information overlaps with content information stored in the HDB 52 (S160). The controller 90 searches the HDB 52 for a record having the same category (C), name (N), and location (L) as those of the extracted content information.

If an identical record is not found within the HDB 52, the controller 90 determines whether there is space to store an additional record in the HDB 52 (S162). If there is sufficient space, the controller 90 adds the newly extracted content information to the HDB 52 (S170). If there is insufficient space to store an additional record in the HDB 52 in step S162, the controller 90 deletes the oldest record (S164) and then adds the newly extracted content information to the HDB 52 (S170).

If an identical record is found within the HDB 52, the controller 90 deletes the identical record from the HDB 52 (S166) and adds the extracted content information to the HDB 52 (S170) or updates new execution time of the identical content.

According to an exemplary embodiment, a limited amount of content information may be added to the HDB 52 in order to prevent the volume of the HDB 52 within the storage device 50 from excessively increasing due to addition of content information. To this end, in the current exemplary embodiment, the controller 90 controls the HDB 52 to store only a sufficient amount of content information to display a list of contents (which will be described later). When there is no more space to add new content information to the HDB 52, the oldest content information is deleted from the HDB 52 before the new content information is added.

The HDB 52 may also be designed to continuously add new content information without deletion of old or overlapping information. In this manner, the HDB 52 continues to be updated by adding new content information. The update of the HDB 52 or addition of new content information is performed each time content is executed on the mobile terminal 100. That is, information pertaining to all contents that have been validly executed on the mobile terminal 100 continues to be stored in the HDB 52.

After the extracted content is stored in the HDB 52, the controller 90 determines whether a command is input to execute other content (S180). If other or additional content is to be executed, the controller 90 returns to step S130 to execute the content as previously described. If no other or additional content is to be executed, the controller 90 continues by determining whether the call key 42 is input by the user (S210). If the call key 42 is input, the controller 90 controls the display 60 to display a list of contents on a screen, using content information stored in the HDB 52 (S220).

Conventionally, when a call key 42 is input while the mobile terminal 100 is in a standby mode, a call history is displayed on the screen of the mobile terminal 100. However, in an exemplary embodiment of the present invention, when the call key 42 is input, a call history as well as a list of contents recently executed by the user is displayed together on the screen.

Figure 4:
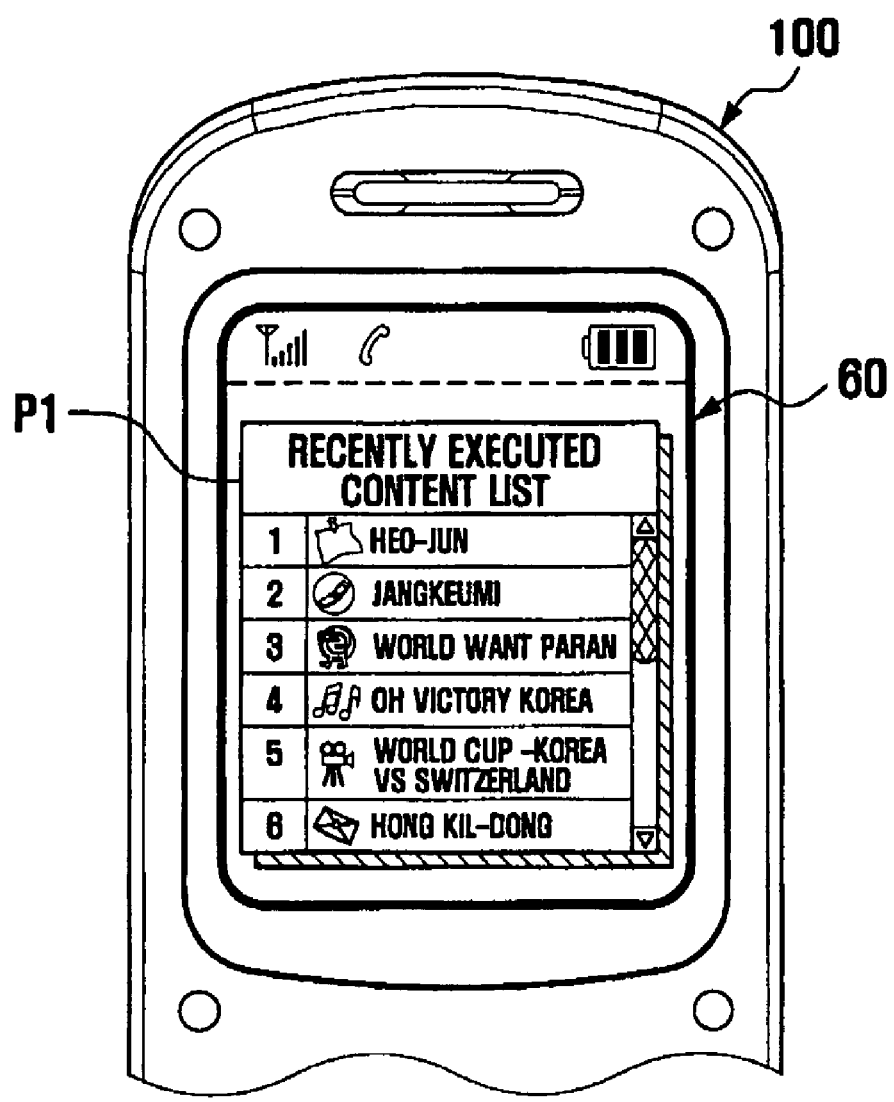
FIG. 4 illustrates a mobile terminal displaying a list of contents according to an exemplary embodiment of the present invention.

FIG. 4 illustrates a mobile terminal displaying a list of contents according to an exemplary embodiment of the present invention.

Referring to FIGS. 1-4, a list of contents P1 is arranged in chronological order. The controller 90 compares the execution started times of the content information stored in the HDB 52 and controls the display 60 to sequentially display content in descending order from most recently executed to least recently executed content. FIG. 4 illustrates an example in which a text message was most recently executed.

In an exemplary embodiment, the list of contents P1 is displayed with the most recently executed content at the top. That is, the content information is arranged in order of most recently executed based on the current point in time. Thus, the contents in the list P1 belonging to various categories are displayed together regardless of category (C).

Each content in the list P1 is displayed by indicating together an icon representing the type of content and the content name. The controller 90 controls the display 60 to display content information, using information stored in the category (C) and the name (N) of the HDB 52. In an exemplary embodiment, an icon is used to represent the category (C) of each content. The list of contents P1 may be displayed in various other ways.

Returning to FIG. 3, if one of the list of contents P1 displayed on the screen is selected by a user (S230), the controller 90 executes the selected content in step S130. Referring to FIG. 4, when the user selects a third content, in other words belonging to the category Internet, from the list of contents P1, the controller 90 may run a browser and access the Internet address www.paran.com for the display 60 to display the corresponding website.

As anther example, when the user selects a sixth content, in other words belonging to the category e-mail, from the list P1, the controller 90 may execute an e-mail program to display an e-mail composition window with the receiver's name automatically set to 'Hong Kil-dong'.

As a further example, when the user selects a fourth content, in other words a music file, or a fifth content, in other words a video file, the controller 90 may execute an application program stored in linker program (A) for the content so that the appropriate file can be played back.

Meanwhile, when the user selects the first content (text message) or second content (phone call), several processes are performed as conventionally and thus are not described here.

According to an exemplary embodiment, when content is executed for longer than a valid duration, information pertaining to the content may be extracted. This also applies when content is executed using a history menu. However, when the content is executed using the history menu, the controller 90 may update only the execution started/terminated time because information pertaining to the executed content is already stored in the HDB 52. However, it is possible to add the content information to the HDB 52 after deleting the previously stored information.

A second exemplary embodiment provides a method for displaying content information stored in the HDB (52 of FIG. 1). The second exemplary embodiment is generally analogous to the previous exemplary embodiment except for the steps (S170 and S220 in FIG. 3) of storing content information in the HDB 52 and of displaying a list of contents on a screen after a call key is input.

Figure 5A:
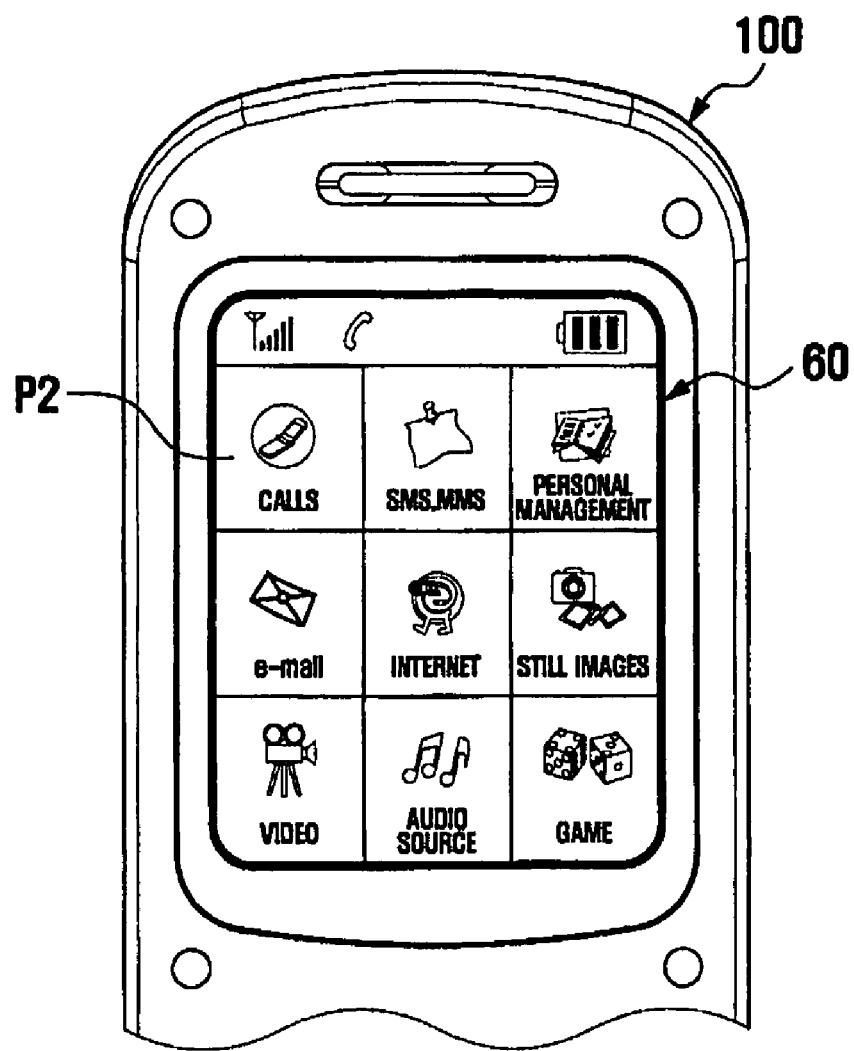
FIGS. 5A and 5B illustrate a mobile terminal displaying a list of contents according to exemplary embodiments of the present invention.
Figure 5B:
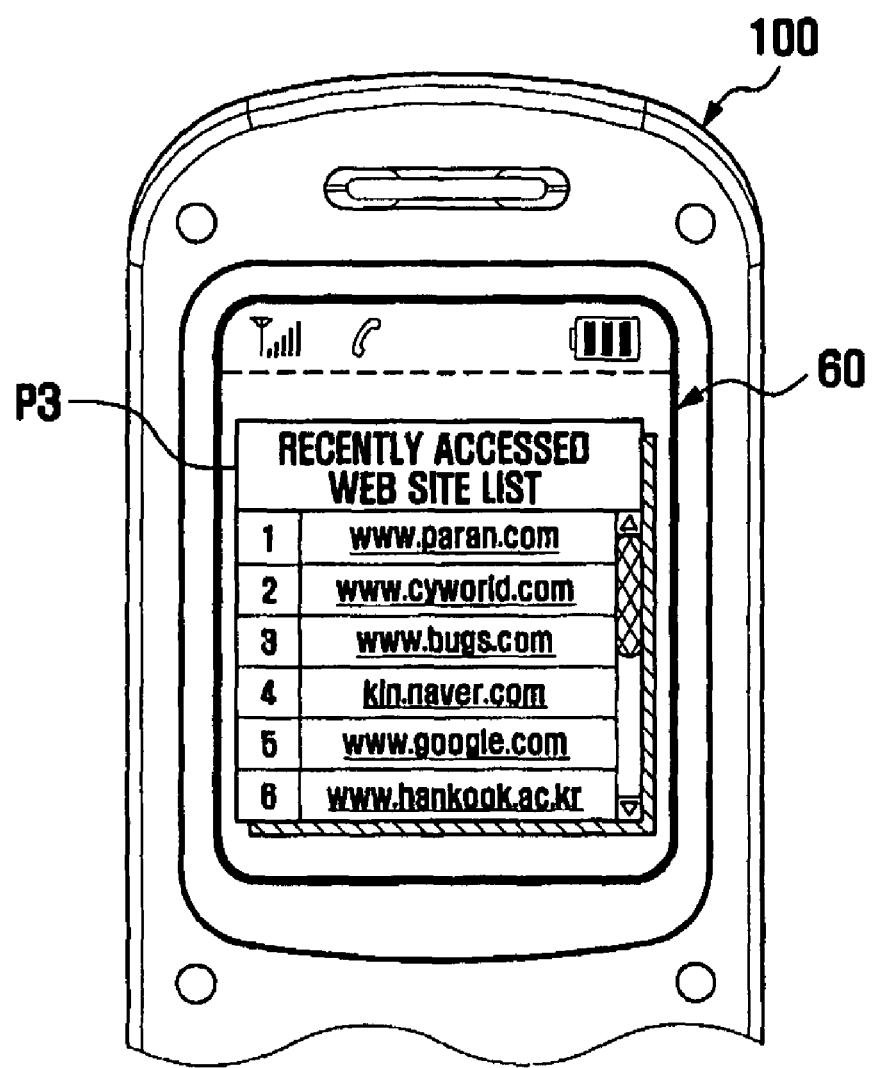

FIGS. 5A and 5B illustrate a mobile terminal displaying a list of contents according to a second exemplary embodiment of the present invention.

Referring to FIGS. 1-3, 5A, and 5B, in the step S220 of displaying a list of contents, the method of a second exemplary embodiment can display a list of contents for each category by using a list of categories P2 in FIG. 5A and a list of category contents P3 in FIG. 5B. To this end, in the step S170 of adding content information to the HDB 52 according to a second exemplary embodiment, the number of contents stored for each category must be less than a threshold number (for example 10). That is, when no space is available in the HDB 52, according to the previous exemplary embodiment, the oldest in the entire content information is deleted in order to add new content information. However, in a second exemplary embodiment, the oldest content information belonging to the same category (C) as that of new content information being added is deleted in order to add the new content information.

Thus, when the user consecutively executes a plurality of contents belonging to the same category (C), this will not affect content information belonging to a different category (C) because content information belonging to the same category (C) is added to or deleted from the HDB 52 so as to maintain therein information pertaining to a number of contents less than the threshold number.

Thus, because this prevents only contents belonging to one category (C) from being stored in bulk, the list of category contents P3 can be displayed regardless of which category a user selects from the list of categories P2. After content information has been stored in the HDB 52 in this manner, a call key may be input by the user in step S210 and a list of contents are displayed in step S220.

When the call key 42 is input, the controller 90 controls the display 60 to display a screen classified into several categories (C) using data set for each category (C) of the HDB 52. Thus, the user first selects the desired category (C).

For example, when the user selects Internet from the categories displayed on the screen, the controller 90 controls the display 60 to display the list of category contents P3 corresponding to the selected category, in other words the Internet, with the most recently executed content at the top, as illustrated in FIG. 5B.

When the list of contents is displayed by category in this manner, the user must make two selections to execute the desired content. However, the display of the list of category contents P3 enables the user to more easily find the desired content.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the structure of the HDB 52 may be changed so as to store a wider range of information extracted from content. Further, while in the above description, the HDB 52 is located within the storage device 50, the HDB 52 can be located at a separate position positioned apart from the storage 50. Furthermore, elements and regions in the drawings may be schematically illustrated for brevity and clarity. Thus, dimensions of the elements or spacing between elements are not to scale.

As described above, a method for using a history menu in a mobile terminal according to the present invention allows display of a list of contents through an input of a call key while enabling a user to execute content upon selection, thus making it easier for the user to re-execute recently used contents.

What is claimed is:

1. A method for using a history menu on a mobile terminal, the method comprising:
   executing content on a mobile terminal;
   determining whether the content is executed for longer than a valid duration;
   extracting content information pertaining to the executed content and comprising information related to linker program for executing the content, when the content is executed for longer than the valid duration;
   storing the extracted content information;
   displaying the stored content information if requested by a user;
   selecting one of the displayed content information; and
   executing content corresponding to the selected content information using a linker program included in the selected content information,
   wherein the valid duration is set according to type of the content.

2. The method of claim 1, wherein the stored content information further comprises at least one of category, name, location, and execution started/terminated time.

3. The method of claim 1, wherein the storing of the extracted content information comprises:
   determining whether the content information pertaining to the executed content is already stored;
   deleting, if the content information is already stored, the already stored content information; and
   storing the extracted content information.

4. The method of claim 3, further comprising, if the content information is not already stored, storing the extracted content information.

5. The method of claim 1, wherein the storing of the extracted content information comprises storing the extracted content information in a history database.

6. The method of claim 5, wherein the extracting of the content information and storing the extracted content information in the history database are performed each time content is executed on the mobile terminal.

7. The method of claim 1, wherein the requesting by the user comprises execution of a call key.

8. The method of claim 1, wherein the displaying of the stored content information comprises displaying on a screen a list of contents arranged in descending order from most recently executed to least recently executed.

9. The method of claim 1, wherein the displaying of the stored content information. comprises displaying on a screen the content information classified into categories.

10. The method of claim 9, wherein the displaying of the stored content information comprises:
    displaying, if requested by the user, a list of categories; and
    displaying, if a category is selected from the list of categories, a list of contents corresponding to the selected category.

11. The method of claim 1, wherein the content comprises at least one of calls, messages, Internet, e-mails, images, music, games, and mobile content.

12. The method of claim 11, wherein the displaying of the stored content information comprises displaying the title or URL (Uniform Resource Locator) address of an immediately previously accessed web page of the content if the content of the displayed content information comprises the Internet content.

13. The method of claim 11, wherein the displaying of the stored content information comprises displaying the sender of an e-mail most recently confirmed by a user if the content of the displayed content information comprises the e-mail.

14. The method of claim 11, wherein the displaying of the stored content information comprises displaying the title or file name of image or music if the content of the displayed content information comprises the image or music.

15. The method of claim 1, wherein the displaying of the stored content information comprises displaying information pertaining to a number of contents less than a threshold number.

16. A mobile terminal device, comprising:
    a controller;
    a display;
    a storage device; and
    a user input device
    wherein the controller executes a content on a mobile terminal, determines whether the content is executed for longer than a valid duration, extracts content information pertaining to the executed content and comprising an information related to linker program for executing the content when the content is executed for longer than the valid duration, stores the extracted content information, displays the stored content information upon request by the user through the key input unit and executes, upon selection of one of the displayed content information by a user, content corresponding to selected content information using a linker program included in the selected content information,
wherein the valid duration is set according to type of the content.

17. The device of claim 16, wherein the stored content information further comprises at least one of category, name, location, and execution started/terminated time.

18. The device of claim 16, wherein the user input device comprises at least one of a key pad, a number pad and a touch screen.

* * * * *